March 19, 1935.  J. W. LEIGHTON  1,994,583

INDIVIDUAL WHEEL SUSPENSION FOR MOTOR CARS

Filed Sept. 13, 1933  2 Sheets-Sheet 1

Inventor
John Wycliffe Leighton

March 19, 1935.  J. W. LEIGHTON  1,994,583
INDIVIDUAL WHEEL SUSPENSION FOR MOTOR CARS
Filed Sept. 13, 1933  2 Sheets-Sheet 2
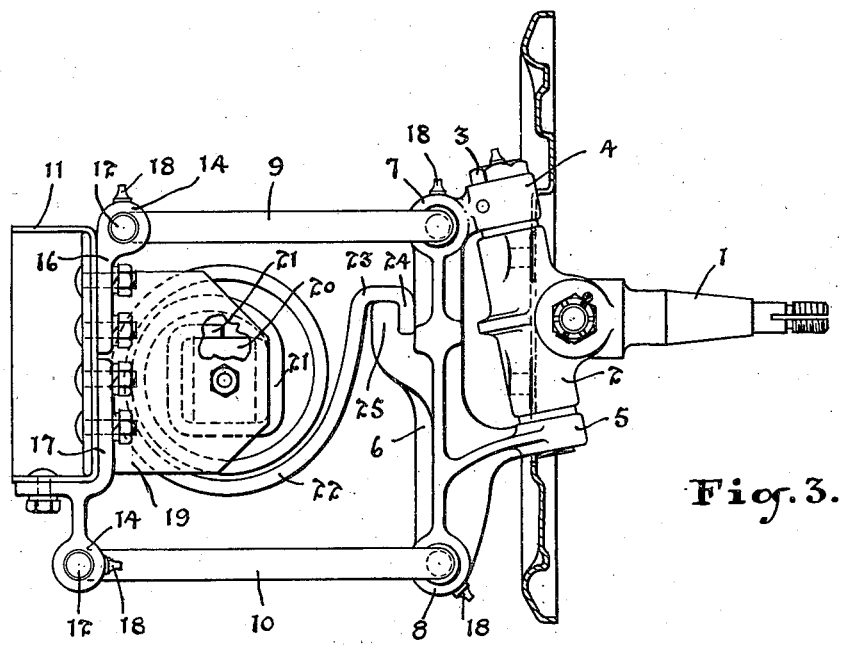
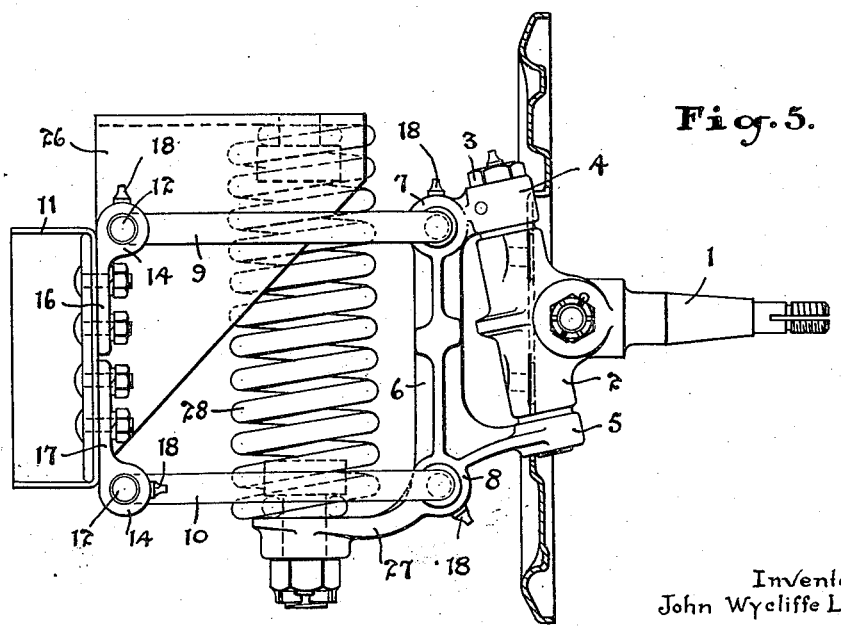
Inventor
John Wycliffe Leighton Patented Mar. 19, 1935

1,994,583

UNITED STATES PATENT OFFICE 1,994,583

INDIVIDUAL WHEEL SUSPENSION FOR MOTOR CARS

John Wycliffe Leighton, Port Huron, Mich.

Application September 13, 1933, Serial No. 689,282

6 Claims. (Cl. 267—20)

The principal objects of this invention are to effectively reduce the unsprung weight in motor cars, thereby diminishing undesirable and harmful vibration, and further, to devise a construction which will operate freely and in which the bearing surfaces will be entirely free from rubbing squeaks and will effectively maintain their lubrication.

A still further and very important object is to devise a structure which will be very easy to assemble.

The principal feature of the invention consists in the novel structure for supporting the vehicle frame from the pivotal king bolt bracket whereby paired angled struts pivotally mounted in threaded bearings on the king bolt bracket are pivotally connected by threaded bearings to the frame structure of the vehicle, the load of the vehicle being suspended on springs interposed between the king bolt bracket and the frame.

In the accompanying drawings, Figure 1 is a plan view of the preferred form of construction and arrangement of parts for carrying this invention into effect.

Figure 3 is a front elevational view.

Figure 5 is a front elevational view of a slightly modified form showing a different form of spring suspension for the frame.

Figure 1:
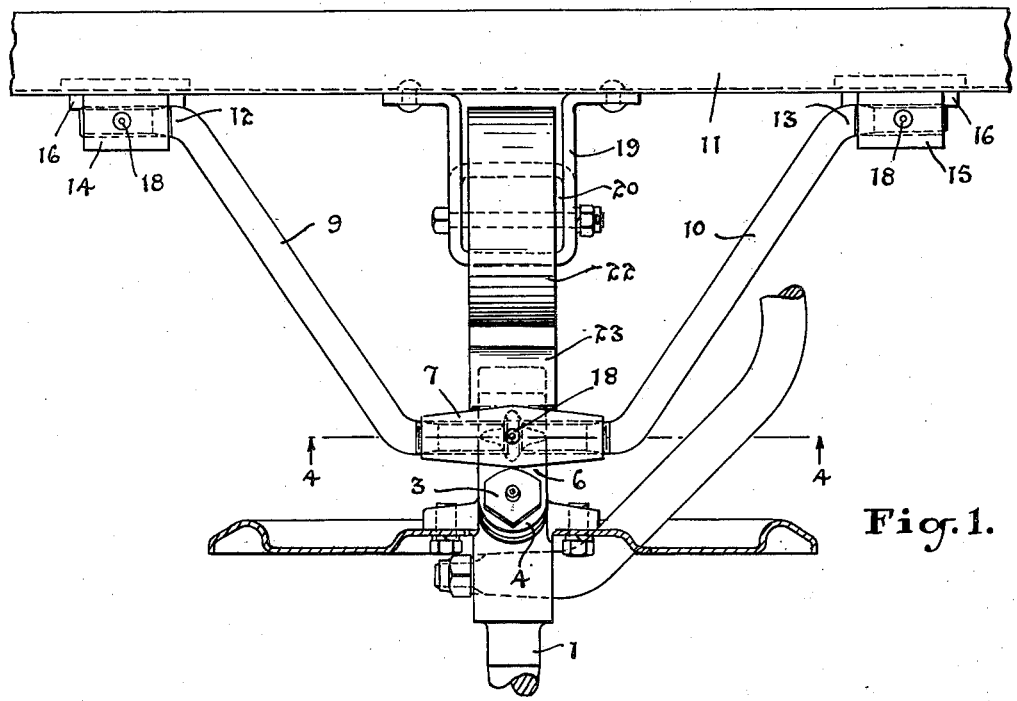
Figure 4:
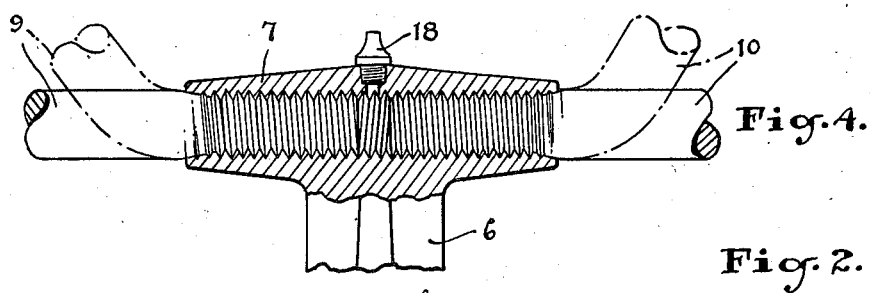
Figure 4 is an enlarged sectional detail taken on the line 4—4 of Figure 1.
Figure 2:
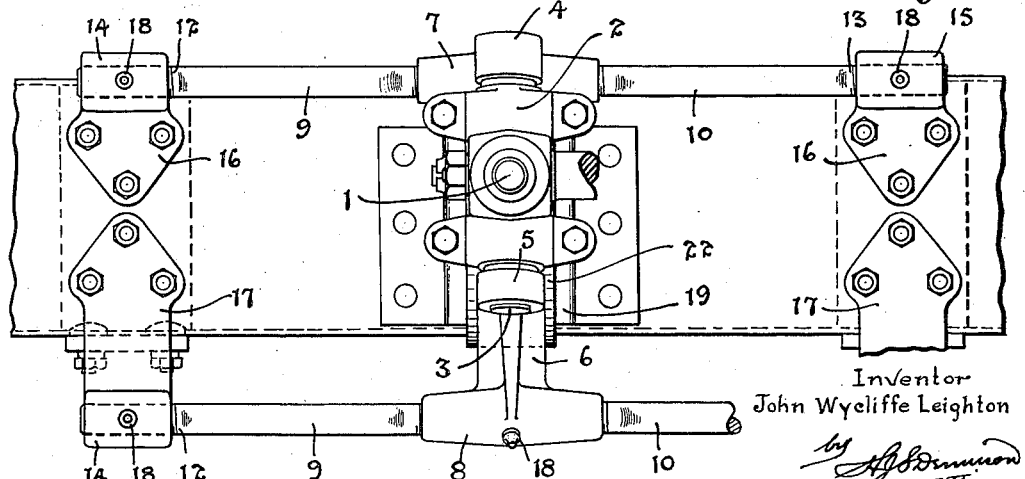
Figure 2 is a side elevational view.

Numerous forms of individual wheel suspension for motor vehicles have been proposed, but most of these are of a complicated nature and such that it will be very difficult to maintain proper bearing supports without loose play.

In the present invention the axle pin 1 is formed with an angularly set sleeve 2 which is journalled upon a king pin 3 mounted between the offset lugs 4 and 5 of the king pin bracket 6.

Horizontal hubs 7 and 8 are formed on the upper and lower portions of the bracket 6 and the hubs are formed with internal threaded bearing surfaces extending from end to end thereof, the threads at the ends preferably flaring outwardly.

A pair of strut members 9 and 10 are mounted in each of the hubs 7 and 8 respectively, each having obtusely angular crank pins threaded to enter the threaded bearing portions of the hubs. The struts diverge angularly from the hubs 7 and 8 and extend horizontally inward toward the vehicle frame 11.

The inner ends 12 and 13 of said struts are arranged obtusely angular and parallel with the ends mounted in the hubs 7 and 8 and they are threaded into threaded bearing surfaces in the cylindrical lug portions 14 and 15 respectively of the brackets 16 and 17 respectively which are rigidly secured to the frame 11.

The struts 9 and 10 swing freely on their threaded bearings, both in the hubs 7 and 8 and in the lugs 14 and 15 respectively.

Suitable lubricant fittings 18 are arranged centrally of the hubs 7 and 8 to direct lubricant into the threaded orifices between the ends of the strut members.

Suitable lubricant fittings are also arranged upon the brackets 16 and 17.

A bracket 19 is rigidly mounted upon the vehicle frame 11 midway between the brackets 16 and 17 and opposite to the axle 1. Between the sides of this bracket is mounted a rigid block 20 upon which is mounted the squared end 21 of a spiral spring member 22. The outer end 23 of this spiral spring extends upwardly and is formed with a down-turned hook 24 which engages an upwardly-turned lug 25 formed on the king pin bracket 6.

The load of the vehicle is thus suspended from the wheels and king pin bracket through the spiral spring 22, and the parallel pairs of strut arms 9 and 10 swing freely in their threaded bearing ends.

In the form of structure shown in Figure 5 a bracket 26 is secured to the side of the vehicle frame 11 and extends outwardly between the strut arms 9 and 10 in central alignment with the axle 1, and the bottom end of the king pin bracket 6 is provided with an extension arm 27 which extends inwardly toward the frame and carries a helical compression spring 28 which engages the underside of the bracket 26, supporting the frame thereon, while the arms 9 and 10 swing freely.

It will be understood from this description that the parallel strut arms 9 and 10 are simple rods of steel having their angled ends threaded to fit the bearing threads of the frame bracket and king pin bracket. The threaded ends of each strut are slightly offset so that there will be a slight tension on each end which will serve to maintain the threaded surfaces in snug engaging contact.

The efficiency of threaded bearing surfaces in structures of this type has been very thoroughly demonstrated in the "silent U" shackle which has come into extensive use in the motor car industry, and with the angularly-disposed struts placed in opposed relation to fore and aft strains, a very rugged yet light weight support is presented.

The simplicity of this construction with its threaded bearing support is its principal virtue. The stresses are distributed over an extensive area and wear will be reduced to the minimum.

The inter-threaded feature of the several elements not only serves to retain the same in cooperative assembled relation but it will be readily appreciated that the threaded bearings extending in the fore and aft direction of the car will present a very extensive end bearing surface which will effectively distribute the severe axial thrusts imposed on the bearing assembly on application of a braking effort on the front wheels, and undesirable end play associated with ordinary bearing structures will be avoided.

What I claim as my invention is:—

1. A wheel support for motor vehicles comprising the combination of a vehicle frame having upper and lower pairs of pivot brackets spaced apart and provided with threaded bearing orifices, strut bars having offset ends threaded in said bearing brackets and arranged in converging pairs, the upper pair being arranged substantially parallel with the lower pair, a king pin bracket having a threaded bearing engaging the convergent ends of the upper pair of strut arms and a threaded bearing engaging the threaded ends of the convergent lower pair of struts, and a spiral spring having one end rigidly secured to the frame and the other end hooked over a projecting portion of said king pin bracket.

2. A wheel support for motor vehicles, comprising the combination with the vehicle frame, a wheel axle and a king pin bracket pivoted thereto, of two pairs of parallel strut arms having their inner ends pivotally mounted in threaded bearings on the vehicle frame with the bearing axes disposed in the fore and aft direction of the vehicle, the outer ends of each pair of struts being converged into substantial axial alignment with each other and engaging the king pin bracket in threaded bearing contact, the threaded bearing engagement of said struts with the frame and king pin brackets serving to retain all of said elements in their co-operative assembled relation and serving further to distribute axial fore and aft thrusts due to braking and minimizing objectionable axial play at the several bearing joints.

3. A wheel support for motor vehicles comprising the combination with the vehicle frame, of upper and lower pairs of pivot brackets on the frame spaced apart and provided with threaded bearing orifices, strut bars disposed in converging pairs and having the convergent and divergent ends disposed in threaded crank formation with the divergent ends threaded in said bearing brackets, the upper pair being arranged substantially parallel with the lower pair, a king pin bracket having a threaded bearing engaging the convergent threaded crank formations of the upper pair of strut arms and a threaded bearing engaging the convergent crank formations of the lower pair of struts, and a spring interposed between the frame and said king pin bracket and resiliently supporting the load of the frame, said threaded crank formations being slightly offset and said struts being assembled in the brackets with the slightly offset ends under tension to intimately engage the bracket bearing threads in non-rattling contact.

4. An individual wheel support for motor vehicles, comprising an axle, a king pin bracket pivotally mounted on said axle and having a pair of horizontally disposed hubs arranged parallel one above the other and each having an internal threaded bearing surface, two pairs of struts each having obtuse angled threaded ends threaded into said hubs in threaded bearing engagement and flaring outwardly therefrom, brackets mounted on the vehicle frame having threaded bearing orifices engaging the other ends of said struts in threaded bearing engagement, a spring mounted on the frame between the flaring pairs of struts and engaging and resting upon said king pin bracket, said struts being assembled under tension in said brackets with the respective threaded obtusely disposed ends thereof in non-rattling pressure engagement with the internal threaded surfaces of all of said brackets.

5. A wheel support for motor vehicles comprising the combination with the vehicle frame, a wheel axle and a king pin bracket pivotally connected therewith and formed with parallel pivot bearings, of paired separate strut arms each formed of a length of light metal rod and having its inner end bent obtusely and pivotally mounted in a bearing on the frame, said paired struts converging outwardly from the obtusely bent ends and each having the outward end bent obtusely in the opposite direction and substantially parallel to the other obtusely bent end, the outer ends of said rods being pivotally mounted in the parallel pivot bearings in the king pin bracket and entered therein from opposite sides of the bracket, whereby a strong floating assembly of light weight and few parts is provided.

6. A wheel support for motor vehicles comprising the combination with the vehicle frame, a wheel axle and a king pin bracket pivotally connected therewith and formed with an elongated threaded bearing orifice from the front and rear sides, paired strut members pivotally connected at their inner ends to the vehicle frame and converging outwardly toward said king pin bracket and having their respective outer ends threaded into the common bearing orifice of the bracket from the opposite open ends thereof, and a lubricant fitting connected with said threaded bearing orifice intermediate of the length thereof to direct lubricant to the bearing orifice intermediately between the end extremities of the struts threaded therein to simultaneously lubricate each strut of the pair from its inward end.

JOHN WYCLIFFE LEIGHTON.